Figure 5:
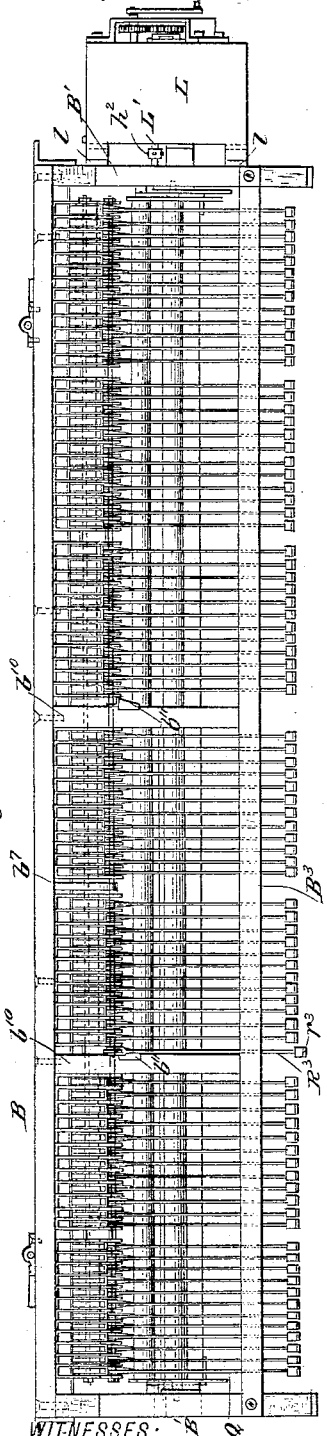

(No Model.) 10 Sheets—Sheet 1.
J. A. DECUIR.
HARMONIGRAPH OR MUSIC RECORDING DEVICE.
No. 398,951. Patented Mar. 5, 1889.
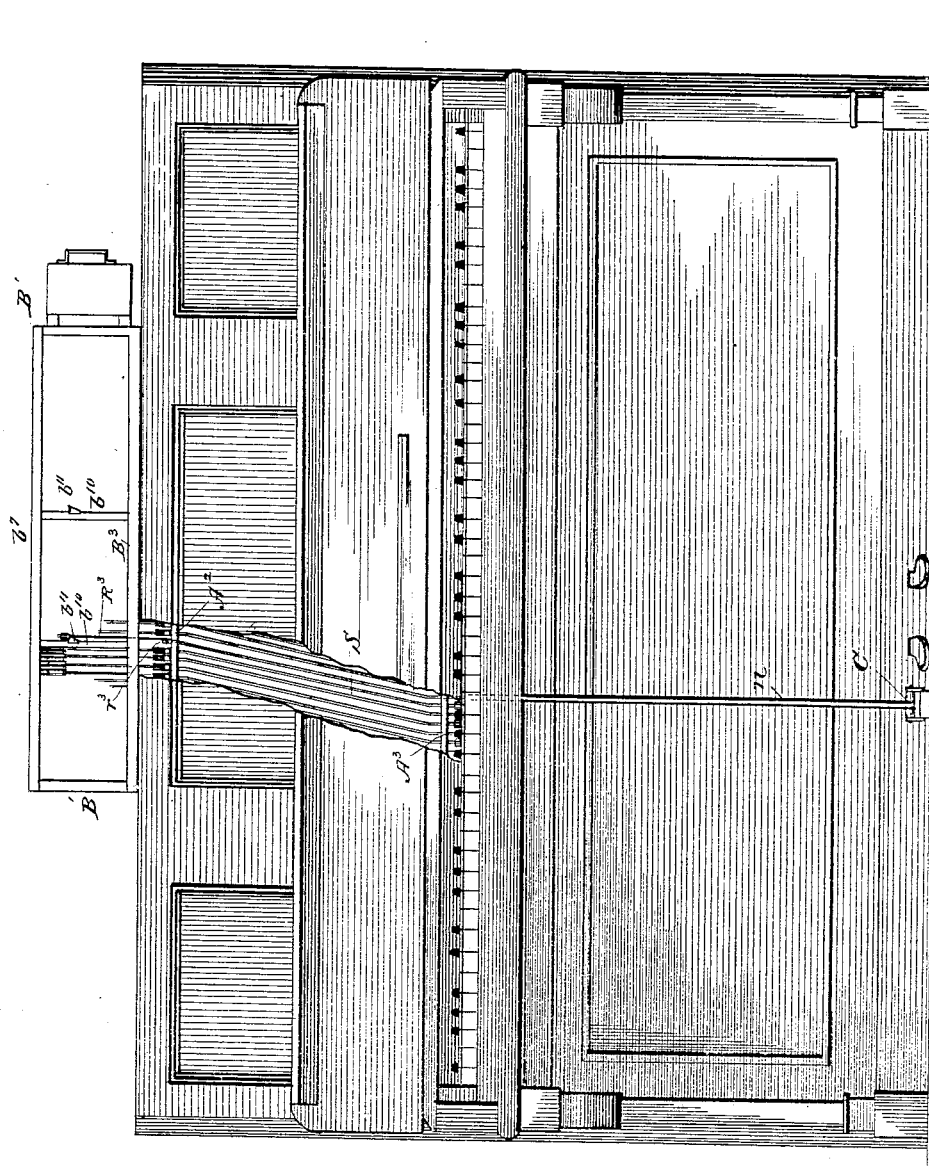

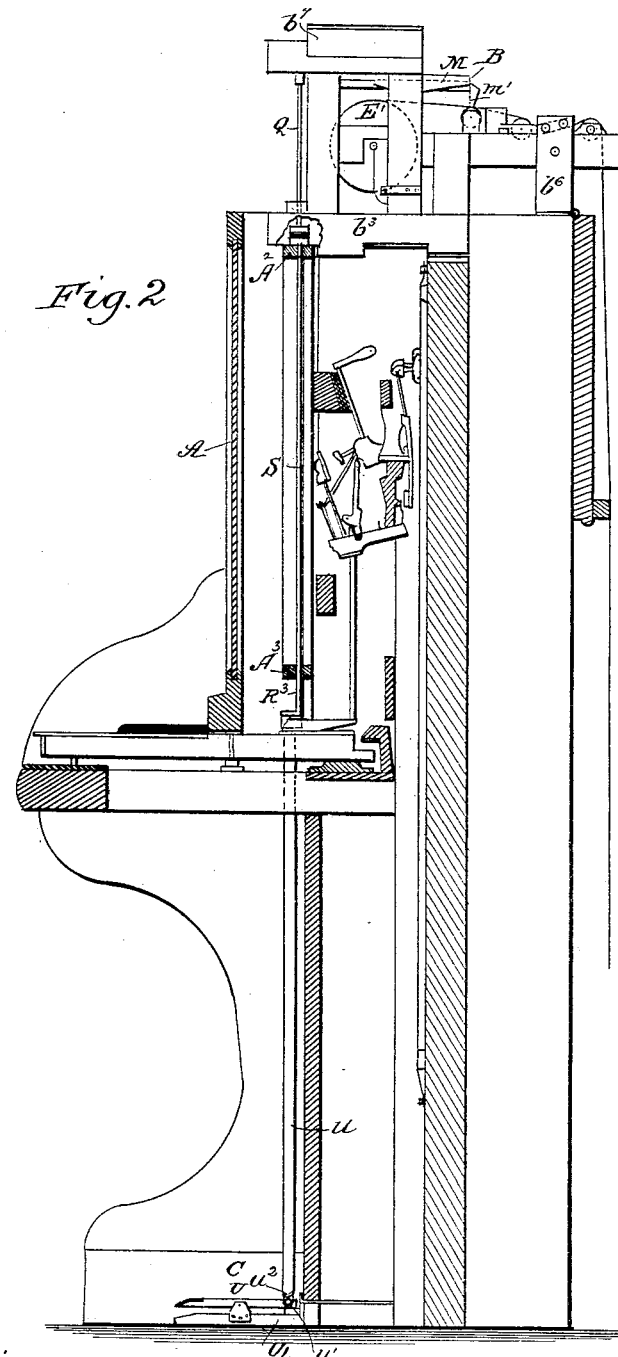

(No Model.) 10 Sheets—Sheet 3.
J. A. DECUIR.
HARMONIGRAPH OR MUSIC RECORDING DEVICE.
No. 398,951. Patented Mar. 5, 1889.
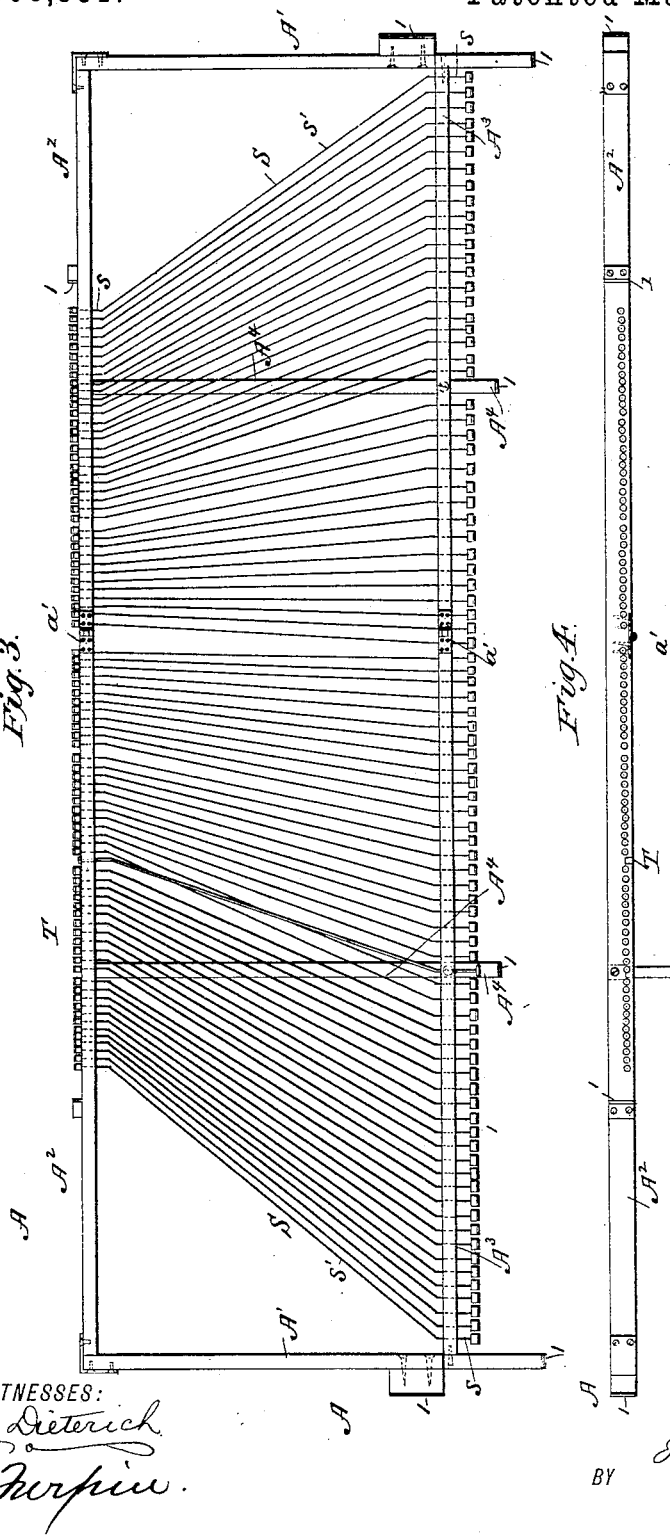

(No Model.) 10 Sheets—Sheet 4.

J. A. DECUIR.
HARMONIGRAPH OR MUSIC RECORDING DEVICE.

No. 398,951. Patented Mar. 5, 1889.

WITNESSES:
Fred J. Dieterich
P. B. Turpin

INVENTOR,
J. A. Decuir
BY
Munn & Co
ATTORNEYS.

(No Model.) 10 Sheets—Sheet 5.
J. A. DECUIR.
HARMONIGRAPH OR MUSIC RECORDING DEVICE.
No. 398,951. Patented Mar. 5, 1889.
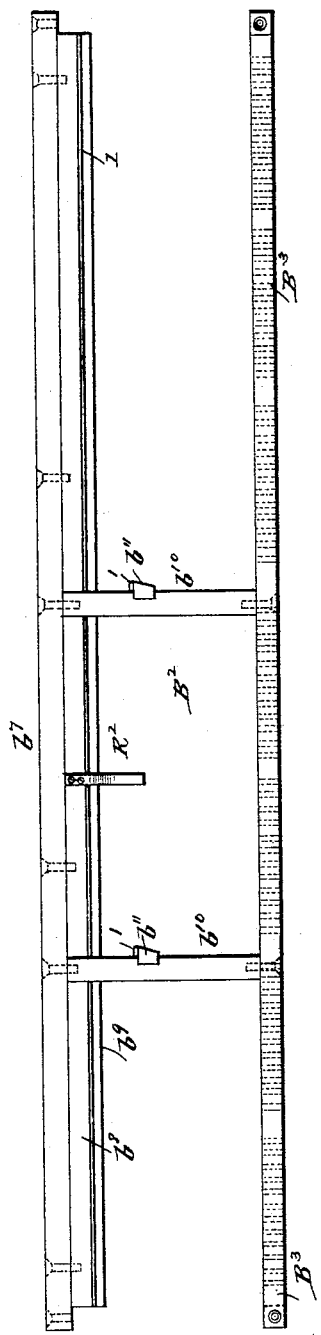
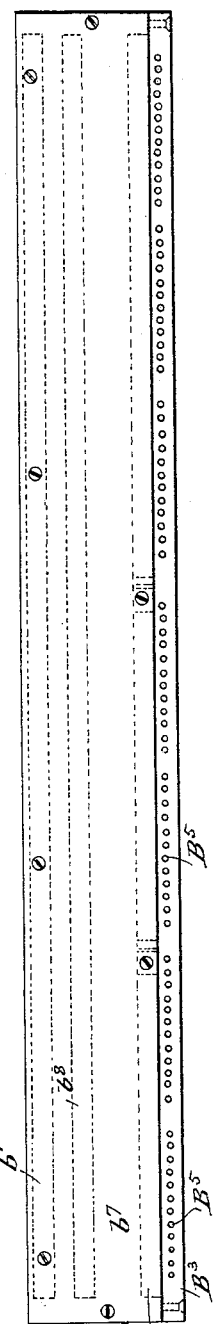
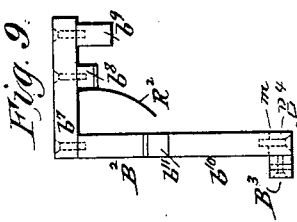

(No Model.)
10 Sheets—Sheet 6.
J. A. DECUIR.
HARMONIGRAPH OR MUSIC RECORDING DEVICE.
No. 398,951. Patented Mar. 5, 1889.
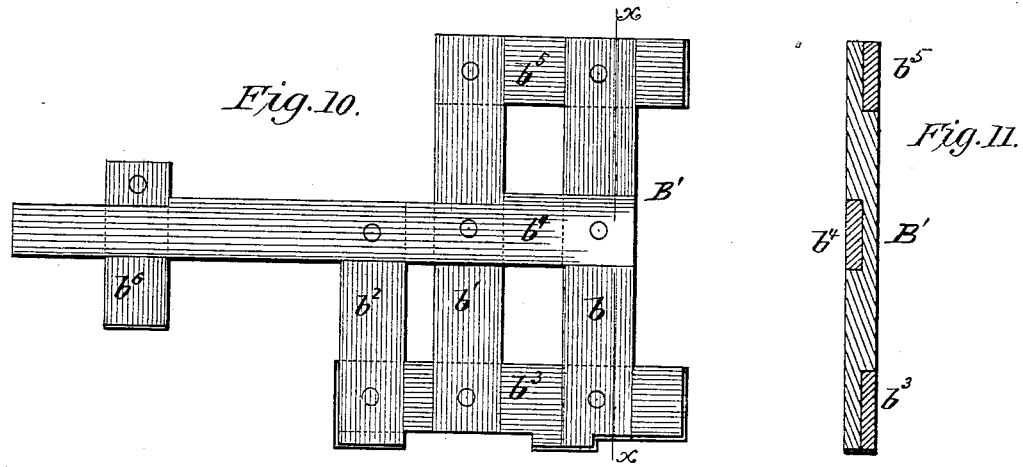
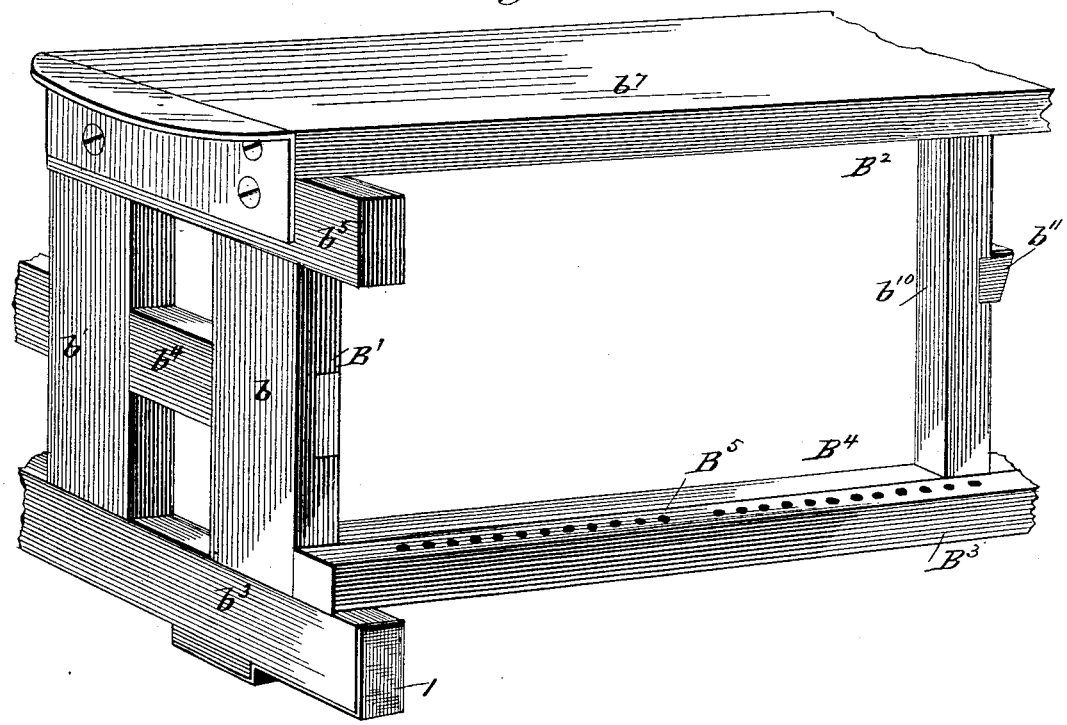
WITNESSES:
Fred J. Dieterich
P. B. Turpin
INVENTOR,
J. A. Decuir
BY Munn & Co.

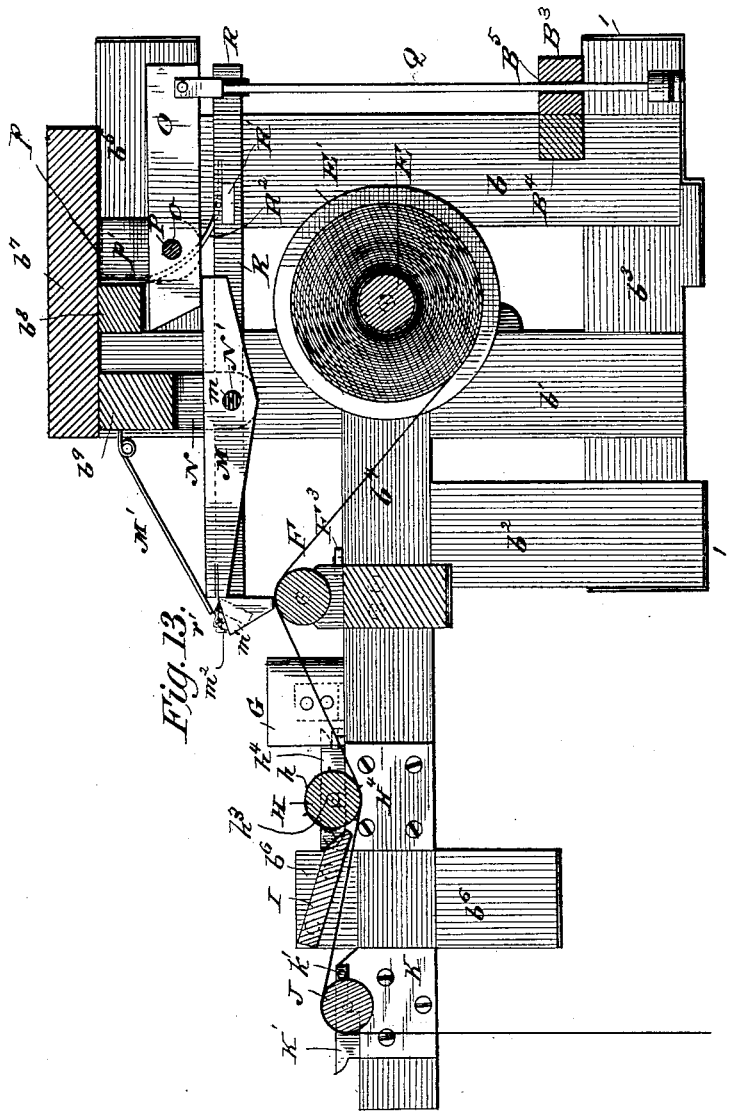

(No Model.) 10 Sheets—Sheet 8.

J. A. DECUIR.
HARMONIGRAPH OR MUSIC RECORDING DEVICE.

No. 398,951. Patented Mar. 5, 1889.

WITNESSES:
Fred G. Dieterich
P. B. Turpin

INVENTOR.
J. A. Decuir
BY Munn & Co.
ATTORNEYS.

(No Model.) 10 Sheets—Sheet 9.
J. A. DECUIR.
HARMONIGRAPH OR MUSIC RECORDING DEVICE.
No. 398,951. Patented Mar. 5, 1889.
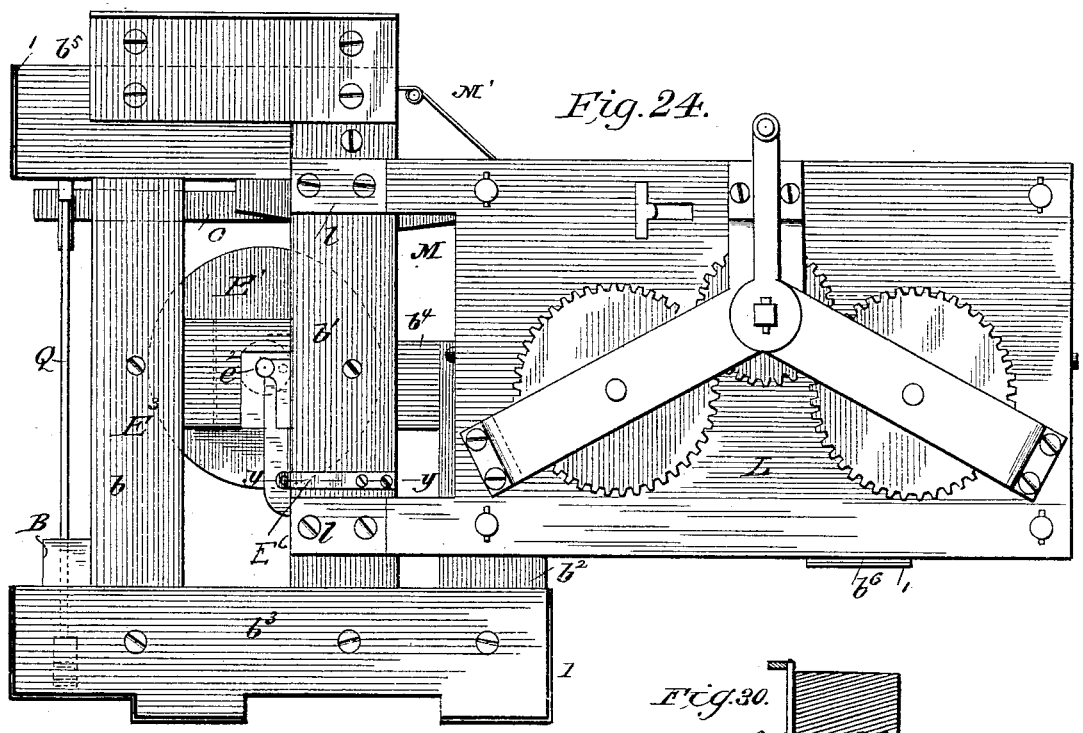
Fig. 24.
Fig. 30.
Fig. 25.
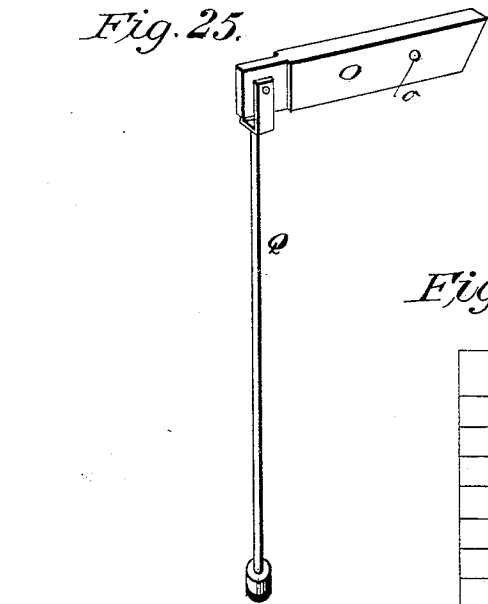
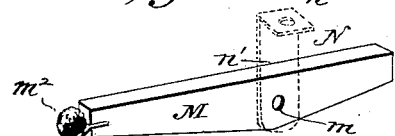
Fig. 26.
Fig. 29.
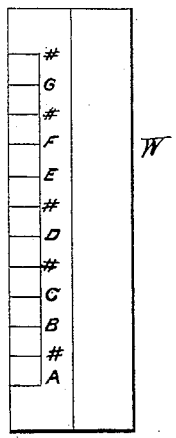
WITNESSES:
Fred G. Dieterich
P. B. Turpin
INVENTOR,
J. A. Decuir
BY Munn & Co.
ATTORNEYS.

(No Model.) 10 Sheets—Sheet 10.
J. A. DECUIR.
HARMONIGRAPH OR MUSIC RECORDING DEVICE.
No. 398,951. Patented Mar. 5, 1889.
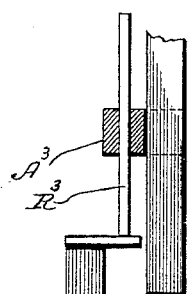
*Fig. 27.*
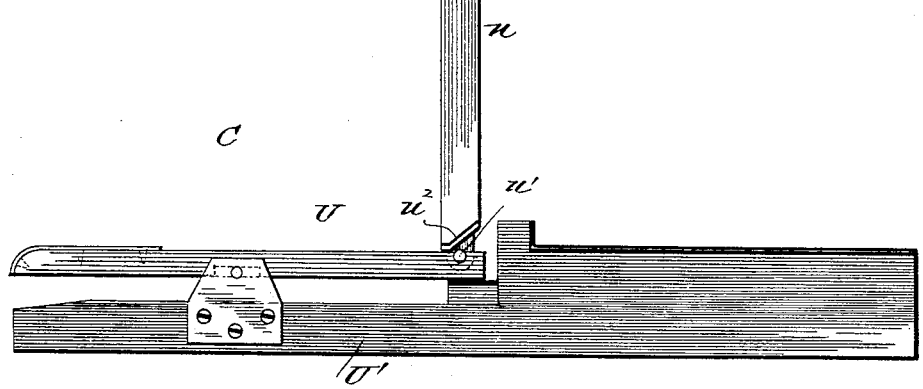
*Fig. 28.*
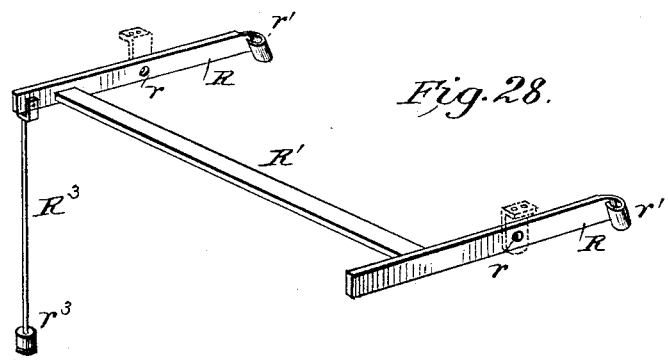
WITNESSES:
INVENTOR,
ATTORNEYS.

UNITED STATES PATENT OFFICE.

JOSEPH AUGUSTE DECUIR, OF NEW ORLEANS, LOUISIANA.

HARMONIGRAPH OR MUSIC-RECORDING DEVICE.

SPECIFICATION forming part of Letters Patent No. 398,951, dated March 5, 1889.

Application filed June 15, 1888. Serial No. 277,198. (No model.)

*To all whom it may concern:*

Be it known that I, JOSEPH AUGUSTE DECUIR, of New Orleans, in the parish of Orleans and State of Louisiana, have invented a new and useful Improvement in Harmonigraphs, of which the following is a specification.

My invention is a harmonigraph or apparatus by which music as it is played on a piano or similar instrument may be suitably indicated on a sheet of paper, so it may be reproduced as desired, thus enabling one improvising to have the music written as it is played in such manner that it may be read and translated into the characters ordinarily employed in writing music. By my improvement I provide construction by which the paper is fed steadily forward and lines are drawn thereon, the said lines being broken by depressing the key corresponding to the said line, the breaks in the lines indicating the notes and the lengths of said breaks the time due said notes. Provision is also made for the indication by suitable marks of the divisions or measures.

The invention consists in the combination, in a harmonigraph, of the markers and the connecting-rods arranged for engagement by the keys of the piano or other similar instrument, and by which the movement of the key may be transmitted to the marker.

The invention consists, further, in the combination, in an apparatus substantially as described, of a tone-character marker and a measure-marker.

The invention consists, further, in the construction of the connecting-rods with straight parallel end portions and inclined intermediate portions.

The invention consists, further, in constructing the frame of the connecting-rod portions in sections foldable, as will be described.

The invention consists, further, in certain other improved constructions and combinations of parts, as will be hereinafter described and claimed.

Figure 6:
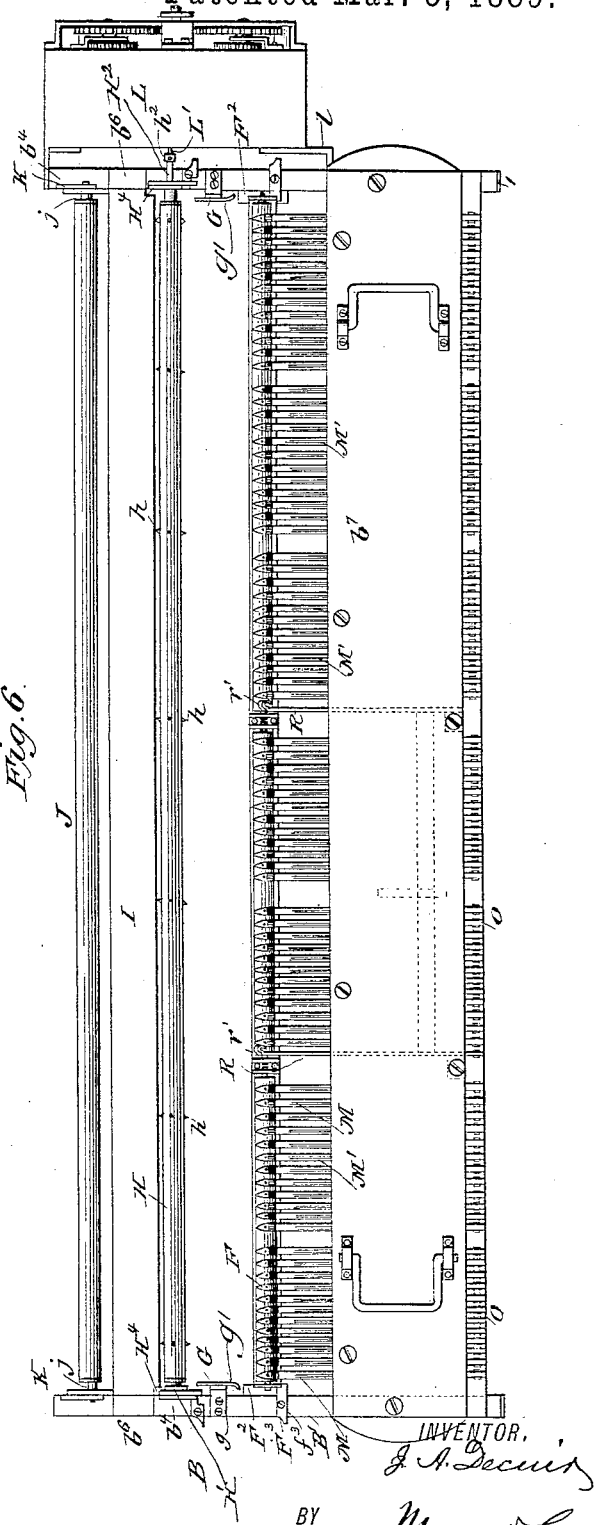
Figure 14:
Figure 15:
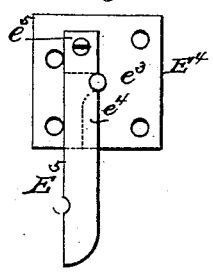
Figure 16:
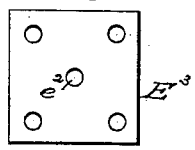
Figure 17:
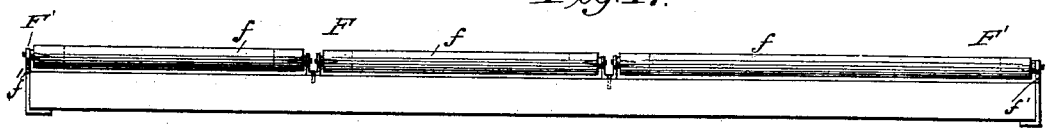
Figure 18:
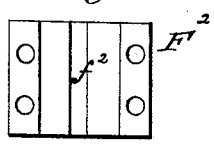
Figure 19:
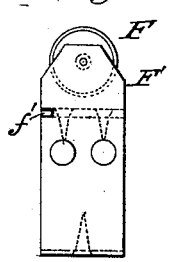
Figure 20:
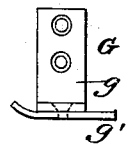
Figure 21:
Figure 23:
Figure 22:
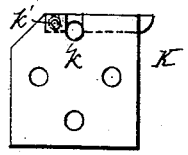

In the drawings, Figures 1 and 2 are respectively front and vertical sectional views of an upright piano provided with my improved device. Fig. 3 is a detail front view of the connecting-rod section. Fig. 4 is a detail top plan view of said section. Fig. 5 is a front view of the marker-section; Fig. 6, a top plan view of such section. Fig. 7 is a front view, Fig. 8 a top plan view, and Fig. 9 an end view, of the connecting portion of the frame of the marker-section. Fig. 10 is a side view of one of the end portions of such frame. Fig. 11 is a sectional view on about line *x x*, Fig. 10. Fig. 12 is a detail view illustrating the manner of connecting or uniting the connecting and end portions of the frame of the marker-section. Fig. 13 is a cross-sectional view of the marker-section with the markers and other parts therein. Fig. 14 is a detail view of the paper-supporting roll. Figs. 15 and 16 are detail views of, respectively, the right and left hand supporting-plates for said roller. Fig. 17 is a detail view of the bed-roller and the supporting-slide therefor. Fig. 18 is a detail view illustrating one of the end supports for said slide. Fig. 19 is a detail view of one of the end supports for said roller. Fig. 20 is a detail view of one of the guides arranged between the feed-roller and the bed-roller. Fig. 21 is a detail view of the outer guide-roller; Fig. 22, a detail view of one of the end supports of such roller. Fig. 23 is a detail view of the inkstands and support or slide carrying the same. Fig. 24 is an end view of the marker-section, illustrating the connection of the mover with the marker-frame. Fig. 25 is a detail view of one of the levers and the hanger for same. Fig. 26 is a detail view of one of the hammers or markers and the hanger therefor. Fig. 27 is a detail view illustrating the treadle and the treadle-rod in connection with a part of the tripper-rod for transmitting the motion to the measure-marker. Fig. 28 is a detail view of the measure-marker. Fig. 29 is a detail view of the rule adapted to facilitate the reading of the marked characters; and Fig. 30 is a detail section on about line *y y*, Fig. 24.

In the construction shown my apparatus comprises a connecting-rod section, A, a marker-section, B, a treadle, C, and a rod, *a*, for transmitting the motion from the treadle to a connecting-rod. In the marker-section I provide markers for making characters to indicate the tones played on the instrument, and also markers for making characters to represent the divisions between the measures in the passage played. The framing of this marker-section is preferably made of end portions, B' B', and connecting portion $B^2$.

Each of the end portions is formed of upright bars $b$ $b'$ $b^2$ and horizontal bars $b^3$ $b^4$ $b^5$, the lower bar, $b^3$, and upper bar, $b^5$, being extended slightly in advance of the front bar, $b$, and the intermediate bar, $b^4$, being extended rearwardly from the bar $b^2$, and being provided near its rear end with a batten-like bar, $b^6$, which extends above and below bar $b^4$. These several bars are framed and secured together in the manner clearly shown in the drawings.

The connecting portion $B^2$ comprises top bar or board, $b^7$, the front and rear bars, $b^8$ $b^9$, secured to the under side of bar $b^7$, the bar $b^9$ projecting slightly lower than the bar $b^8$, and both bars $b^8$ $b^9$ being arranged to terminate at points in from the ends of bar $b^7$, the upright bars $b^{10}$ depending from the bar $b^7$, and having their front edges arranged flush with that of bar $b^7$, and being provided on their sides with stops $b^{11}$ for the front arms of the measure-marker.

I also provide the connection portion $B^2$ with front and rear base-bars, $B^3$ and $B^4$, the latter being secured to the under sides of the uprights $b^{10}$, and the bar $B^3$ being secured to the front side of bar $B^4$. The bar $B^3$ extends at its ends to a point in line with the ends of the bar $b^7$, while the bar $B^4$ terminates short of the ends of bar $B^3$ and in line with the bars $b^8$ $b^9$. Through the bar $B^3$, I form openings $B^5$ for the pendent rods, presently described.

In uniting the portions B' $B^2$ of the marker-section frame the end portions, B, are seated under the ends of top board, $b^7$, and the front bar, $B^3$, is rested on the forwardly-projecting portions of lower bars, $b^3$, and portions B' and $B^2$ are then firmly united by means of screws, as shown, or in other suitable manner, thus forming a strong frame in which to support the several parts constituting the marker and those for supporting and moving the paper.

I support the roll of paper on a roller, E. From under the roller E the paper passes over the bed roller or rollers F, thence between the guides G, under feed-roller H, under strip I, and over the rear guide-roller, J, whence it may fall back of the piano as the playing and writing proceeds. The roller E is preferably provided with the end plates or flanges E' to retain the paper, and in the construction shown I form the roller of an intermediate or main portion, $e$, having its ends socketed to receive stem-like portions $e'$, projected inwardly from the flanges E', trunnions $E^2$ being projected from the outer sides of said flanges to enter the bearings provided in the framing. These bearings consist of the plates $E^3$ and $E^4$, the plate $E^3$ having simply a socket or opening, $e^2$, forming a seat for one of the trunnions, while the plate $E^4$ has a notch-like seat, $e^3$, and a slot, $e^4$, leading from its lower edge to said seat $e^3$, and is provided with a lever-like latch-keeper, $E^5$, pivoted at $e^5$ to the plate $E^4$ above seat $e^3$, and movable into position to retain the trunnions in said seat or to permit its application or removal, as may be desired, a spring-latch, $E^6$, operating to hold keeper $E^5$ in locked position.

The bed-roller F is preferably formed in three sections, $f$, mounted in independent bearing-plates secured on the supporting-bar, the end plates F', forming part of the slide, being provided with notches $f'$.

In applying and removing the slide it is preferably moved upward from below in guideways $f^2$. These guideways are preferably formed in plates $F^2$, secured to the inner sides of the end portions of the framing and have their inner faces grooved vertically, forming the ways $f^2$, catch-plates $F^3$ being pivoted at $f^3$ and movable into and out of notches $f'$, whereby the bed-roller support may be secured, as desired, or released to permit the removal of same and the application of the ink-cups, as will be hereinafter described.

The guides G consist of base-plates $g$, secured on the marker-section framing, and having at their inner ends upright plates $g'$, which direct the opposite edges of the paper.

The feed-roller H is adapted to move the paper along, being in the present instance provided with radially-projected spurs $h$, which enter the paper and draw it along as the feed-roller is turned. At its ends the said feed-roller has trunnions H' $H^2$, the latter being extended and provided at its outer end with a coupling-section, $h^2$. These trunnions H' $H^2$ are journaled in bearing-notches $h^3$ in plates $H^4$, to which are pivoted latches $h^4$, which may be turned down over the trunnions H' $H^2$ to retain them in the notches $h^3$. In rear of the feed-roller I provide the guide-strip I, under which the paper passes, and which prevents the paper from being drawn upward by its contact with the feed-roller, and the rear guide-roller, J, has trunnions $j$ journaled in plates K, having seats $k$ for the trunnions $j$, keeper-plates K' being pivoted at $k'$ and arranged to turn over and retain said trunnions $j$ in their bearings.

The mover L is a clock-train inclosed in a suitable casing or frame provided with lugs $l$, through which screws or bolts may be passed into the framing of the marker-section to secure the mover in position. The power-shaft of this mover is extended at L', and enters the socket of the coupling-section $h^2$ of trunnion $H^2$, in which it is secured by a cross-pin, as shown; but manifestly the coupling may be effected in any suitable manner.

Manifestly any suitable clock-train mechanism may be employed, and I have not therefore thought it necessary to illustrate the particular construction of said mechanism.

The markers are hammer-bars M, pivoted between their ends at $m$, and provided at their rear ends with the ink-carriers, which consist of cup-like holders $m'$, made funnel-shaped and having their lower ends open and small bodies of sponge or bunches of camel's hair $m^2$ held in said holders and drawn into and slightly through the openings in the bottom, so as to transfer an ink-mark to the paper as it is drawn below the markers, ink being properly supplied.

The ink used may be the ordinary black and red ink with the addition of a small portion of glycerine, and I find it convenient to keep said ink in ordinary oil-cans, one of which I paint red and the other black, employing them to hold the correspondingly-colored ink.

The ink-carriers constituting the markers proper bear immediately above the bed-roller, and it will be understood that where desired crayons may be used to make the mark, instead of the ink; but I prefer the construction as shown, as by same I am able to secure a clearer and more durable mark.

The rear ends of the markers are depressed by means of springs M' bearing between them and the framing, as shown. In pivoting the hammers M, I provide hangers N, having top plates, $n$, lapped against the under side of the top board of the frame, and depending plates $n'$, which extend between the hammers and have openings for the passage of the rod N', which passes through said openings and through the hammers and serves to pivot the said hammers. The plates $n'$ also form divisions between the adjacent hammers or markers, so the movement of one cannot effect the movement of the others by frictional contact.

The levers O are pivoted at $o$ on a rod, P, which extends through said levers and through the depending plates $p'$ of hangers, which hangers are similar to hangers N and have top plates, $p$, secured to the under side of the top board of the framing. At their rear ends these levers O bear directly over the forward ends of the hammers M, so the elevation of the front end of one of the levers O will effect an elevation of the marker proper on the corresponding marker bar or hammer by depressing the forward end of such marker, as will be understood.

To the forward ends of levers O, I connect the upper ends of rods Q, which depend thence through openings $B^5$ in the bar $B^3$, and for a short distance below said bars $B^3$, and are suitably adapted at their lower ends for engagement by the upper ends of the connecting-rods, the rods Q and the levers serving as the medium through which the motion of the connecting-rods is transmitted to the marker.

The measure-marker comprises lever-like bars R, pivoted at $r$ between their ends, and provided at their rear ends with holders $r'$, suited to receive crayon or other suitable marking devices. In rear of the pivot $r$ the bars R are connected by a cross-bar, R', fixed rigidly to both of them and serving to transmit the motion of one bar to the other, as well as to receive the bearing of the spring $R^2$, fixed at one end to the bar $b^8$ of the marker-section frame, and bearing at its opposite end against the cross-bars R', whereby to normally depress the forward end of the bars R, and so hold the measure-markers at the rear ends of said bars usually elevated clear of the paper.

To the forward end of one of the bars R, I connect a rod, $R^3$, which depends through opening $B^5$ in the bar $B^3$, and is adapted at its lower end below bar $B^3$ for engagement by the upper end of an intermediate or connecting rod, preferably by providing such rod $R^3$ with a button-like head, $r^3$, as shown. The bars R bear in advance of their pivots on stops $b^{11}$, provided on the bars $b^{10}$. As the bars R are operated to bring the measure-markers into contact, a mark will be made to indicate the beginning of the measures.

By combining markers for representing tone-indicating characters, a mover by which the paper marked may be fed along, and markers for indicating measures, it will be seen that if one part of a composition is played fast and the other slow, the measures being marked, no difficulty will be experienced in reading from the marked paper, and the length of the paper between the measure-indicating marks will also serve as a guide in reproducing the music, to aid in producing the same effects in variations of time in playing the different parts of the composition.

It will be understood that the performer should indicate on the paper at the beginning or at the end of the piece the time in which the composition is played—that is to say, double, triple, common, or the other time employed.

The marker-section having been described, I shall now proceed to describe the connecting-rod section; but preliminary to such description I desire to call attention to the difference in width between the marker-section and the key-board of the piano and the connecting-rod section which corresponds in width to the key-board. This arises from the fact that it is convenient to have the marker-section in as compact a form as possible, and that it is also convenient to form the tone-indicating characters close together, as their relative arrangement can by reason of such close arrangement be more easily determined than when they are arranged farther apart.

The framing of the connecting-section A comprises end bars, A' A', top bar, $A^2$, base bar, $A^3$, and brace-bars $A^4$ $A^4$, parallel to the end bars, the frame being formed in foldable sections by making its top and base bars in sections hinged together at $a'$ $a'$, so the frame can be conveniently folded into a space about equal as to length to that of the marker-section.

Through the top and base bars I form guide-openings for the connecting-rods S, which transmit motion to the tone-indicating markers, and for the rod T, which transmits motion from the pedal-rod to the measure-markers.

The rods S are arranged to converge toward the top of the frame, to which end they are formed with end sections, s s, parallel to each other, and with an intermediate portion, s', inclined with reference to said end portions, so that upward movement imparted to the lower end of said rods by the rear ends of the piano-keys may be transmitted at the opposite end of the rod in a different vertical plane from the lower end of the rod and of the key imparting the initial movement.

The operation is simple. It will be seen that as the paper is moved forward the performer plays on the piano, and as the different keys are played the markers corresponding to said keys are raised from the paper and a blank space is left in the line made by said marker, which line indicates the note or the tone corresponding to said note, and the length of said blank space or interval indicates the time due the note indicated by said space or interval. In order to operate the measure-marker, I provide a treadle, U, mounted on a base or support, U', which is slipped partially under the piano-frame to the left of pedal of the piano, in position for convenient operation by the foot of the performer. To this pedal I connect a rod, $u$, which extends up and outside of the piano through a suitable opening in the under side of the key-board, and is arranged to engage the lower end of rod T, so the operation of the measure-marker may be conveniently effected by the foot of the performer. In connecting rod $u$ to the pedal it is preferred to provide the pedal with socket-like seats $u'$ and the rod $u$ with studs $u^2$, to fit removably therein, so the pedal and rod can be easily detached for convenience in storing the device when not in use.

It will be seen that I provide the several parts of the framing of the different sections with felt at 1, at the points where contact is made with the piano, for the purpose of preventing damage to the piano, as well as to prevent, as far as possible, the transmission of the vibrations to the marking devices in such manner as to produce an objectionable rattling thereof.

For the purpose of preventing the markers from drying when the apparatus is not in use, I provide the ink-wells $v$, mounted on a support, V, and corresponding in number and arrangement to and fitted to receive the points of the marker proper, so that when the performer has finished using the apparatus the bed-roller and support may be removed and the ink-wells and support substituted therefor, the support being provided at V' with notches to receive the catch-plates $F^3$, so it can be secured and removed similarly to the bed-roller support before described.

The ruler W is adapted to facilitate the reading of the characters marked on the paper, the ruler being graduated correspondingly to the marks on the paper, and the letters corresponding to the keys C, C sharp, &c., being inscribed on said ruler.

In applying the apparatus to a piano of the upright variety the pedal may be first applied in the manner above described and its stick or rod placed in position. The connecting-rod section is then placed in position inside the casing, immediately in front of the key-wires, the section being so arranged that the lower ends of the connecting-rods will be in position for engagement and operation by the keys as the instrument is played. It will be understood that in order to place the said connecting-rod section the front part of the piano must be opened, and then shut after the section is placed in position. The marker-section may now be placed in position on top the piano, with the rods thereof in position for engagement by those of the connecting-rod section. When not in use, the apparatus may be removed from the piano and stored in a suitable box or receptacle fitted to receive it.

The pedal-marker makes two dots or small marks in a line at right angles to the direction of movement of the paper, so that after playing, when it is desired to read the music marked, it is desirable to draw lines across the paper through these measure-marks to properly divide the piece into measures by marks that can be quickly seen.

Manifestly I do not desire to be limited in the broad features of my invention to the particular construction shown.

It will be understood that instead of providing the intermediate levers for the transmission of the movement of the connecting-rods to the markers the said rods might be arranged to transmit their motion directly to the said markers instead of indirectly, in the manner shown. I prefer, however, the construction as shown and before described.

Having thus described my invention, what I claim as new, and desire to secure by Letters Patent, is—

1. In a harmonigraph, a connecting-rod section consisting of the frame having guideways for the rods and formed in sections, whereby it may be folded, and the rods supported and movable in the guideways of such frame, substantially as set forth.

2. A harmonigraph, substantially as described, comprising a marker-section and a connecting-rod section, whereby to transmit the motion of the keys to the marker-section, such connecting-rod section having its rods arranged to converge upwardly, and being made in sections foldable, substantially as set forth.

3. In a harmonigraph, a connecting-rod section having its rods arranged to converge, as described, and formed in sections foldable, substantially as set forth.

4. In a harmonigraph, the combination, in the marker-section, of the framing, the paper-carrying roller journaled in said framing, the hammers, and the levers arranged to engage the hammers and pivoted in the framing above the paper-carrying roller, the bed roller or rollers journaled in said framing in rear of the paper-roller, and the feed-roller, substantially as set forth.

5. In a harmonigraph, the combination, with a marker by which to indicate tones or notes, of measure-indicating markers, substantially as set forth.

6. In a harmonigraph, the combination of the hammers pivoted between their ends and provided at one end with the markers, the levers pivoted between their ends and engaged at one end with the ends of the hammers opposite the markers, and connections whereby to transmit motion from the keys of the musical instrument to the ends of the levers, substantially as set forth.

7. In an apparatus substantially as described, the combination of the paper-support, the feeder, the mover for operating said feeder, the marker for indicating tones or notes, and the measure-indicating marker, substantially as set forth.

8. A harmonigraph having a bed along which the paper to be marked is passed, and provided with a marker bearing normally on the said bed or the paper thereon, whereby to normally mark the paper, and connections between the said marker and the keys of the musical instrument, whereby by the operation of said keys the marker may be lifted clear of the marked paper sheet, leaving a blank in the line drawn on such paper, substantially as set forth.

9. In a harmonigraph, the combination, with a supporting-frame and a series of bars, of hangers having top or end plates secured to the supporting-frame and depending plates fitting between the adjacent bars, the bars and plates being provided with coincident openings, and the pivot-shaft passed through said openings, substantially as set forth.

10. In a harmonigraph, the combination, with the bed over which the paper is directed, of the pivoted markers and springs engaging said markers, whereby to operate the same, substantially as set forth.

11. In a harmonigraph, a marker consisting of lever bar or support pivoted between its ends, a cup-like holder supported at one end of the bar, and an absorbent body in said holder, substantially as set forth.

12. In a harmonigraph, the combination, in the marker-section, of the framing provided with guideways for the depending rods Q, the markers or hammers, the levers pivoted between their ends, arranged at one end to engage the markers, and the rods Q, connected at their opposite end with the levers and extended through the guideways in the framing, substantially as set forth.

13. In a harmonigraph, the combination, with the supporting-frame and the markers, of the paper-supporting roller, a bearing for one end of said roller, and a bearing for the opposite end of said roller, the latter bearing consisting of a plate having a slot cut from its lower edge, and provided at its inner end with a seat-notch and a pivoted latch-plate, whereby to hold the trunnion of the roller in said seat-notch, substantially as set forth.

14. A harmonigraph comprising the supporting-frame, the markers adapted to mark with ink, the bed over which the paper is drawn below said markers, and fastenings for detachably securing said bed, whereby it may be replaced by the ink-well support, substantially as set forth.

15. In a harmonigraph, the combination of the markers for indicating tones or notes, connections by which said markers may be operated from the keys of the piano or similar instrument, the measure-marker, and a treadle, whereby said marker may be operated by the foot of the performer, substantially as set forth.

16. In a harmonigraph, a marker proper consisting of a funnel-shaped cup open at its large and small ends and the carrier or absorbent body fitted in said cup and drawn through the small end thereof, substantially as set forth.

17. The combination, with the marker-section frame, of the measure-marker consisting of the lever arms or bars pivoted between their ends, having crayon-holders at their rear ends, a cross-bar extended between said arms and connected rigidly to both of same, and the spring engaging said bar, substantially as set forth.

18. In a harmonigraph, the combination of the paper-support, the markers, the bed-roller, the feed-roller, and the side guides arranged between the feed-roller and the bed-roller, substantially as set forth.

19. In a harmonigraph, the combination, with the markers and the paper-support, of the feeding-roller and the guide-strip which prevents the paper from being drawn or carried upward by the feed-roller, substantially as set forth.

20. A harmonigraph having markers by which to indicate tones or notes and provided with a measure-marker, and a treadle by which the same may be operated by the foot, substantially as set forth.

21. In a harmonigraph, the combination of a measure-marker having a bar pivoted between its ends and provided at its forward end with a depending rod, a connecting-rod arranged at its upper end to engage the lower end of said depending rod, the treadle, and the treadle-rod arranged to engage the lower end of the said connecting-rod, substantially as set forth.

JOSEPH AUGUSTE DECUIR.

Witnesses:
E. BOWEN,
L. R. GANDOLFO.